United States Patent [19]

Onishi et al.

[11] Patent Number: 4,814,901

[45] Date of Patent: Mar. 21, 1989

[54] VIDEO CASSETTE RECORDER FOR RENTAL USE WHICH IS RENDERED UNUSABLE AFTER A PREDETERMINED PERIOD OF TIME

[75] Inventors: Masami Onishi, Kyoto; Toshikazu Masumoto, Ibaraki; Kazumi Murakami; Kiyoshi Yoshida, both of Hirakata, all of Japan

[73] Assignee: Matsushita Electric Industrial Co., Ltd., Kadoma, Japan

[21] Appl. No.: 926,626

[22] Filed: Nov. 4, 1986

[30] Foreign Application Priority Data

Nov. 8, 1985 [JP] Japan .............................. 60-251420
Feb. 18, 1986 [JP] Japan .............................. 61-34747

[51] Int. Cl.[4] ........................ H04N 5/78; G11B 31/00

[52] U.S. Cl. .................................. 360/33.1; 369/19; 340/309.15; 368/10; 368/107

[58] Field of Search ........................ 360/33.1; 369/19; 368/10, 107, 108; 340/309.15

[56] References Cited

U.S. PATENT DOCUMENTS 4,193,120 3/1980 Yello .............................. 364/900 X
4,455,093 6/1984 Bowen et al. ........................ 368/10
4,624,578 11/1986 Green ................................ 368/10
4,626,106 12/1986 Hooper ......................... 360/33.1 X

*Primary Examiner*—Aristotelis M. Psitos
*Attorney, Agent, or Firm*—Wenderoth, Lind & Ponack

[57] ABSTRACT

A video cassette recorder for rental use having a timer means for counting the preset time, a back up power-supply such as battery and so on, and a start means for starting said timer means whereby the recorder makes only the normal reproducing operation impossible to perform till the re-start is performed after the lapse of the preset time from the timer start.

6 Claims, 3 Drawing Sheets

VIDEO CASSETTE RECORDER FOR RENTAL USE WHICH IS RENDERED UNUSABLE AFTER A PREDETERMINED PERIOD OF TIME

BACKGROUND OF THE INVENTION

The present invention relates to a video cassette recorder for rental use (hereinafter referred to as VCR) which makes it impossible to effect the reproducing operation after a predetermined time.

Conventionally, a method of accumulating energization time to turn off the AC power supply of the appliance when the energization time reaches a predetermined time is provided as a method of making it impossible to perform the operation after the picture appliances such as TV set, VCR and so on have been set. However, the method has various problems when a user takes the VTR for rental use to his house to use it. One of the problems is that the method of accumulating the energization time cannot achieve the object of simplifying the lending charge or preventing the thefts through rendering it impossible to perform the operation after a given period of the contract, because the using time, i.e., the energization time is different respectively depending upon the user. Another problem is that in the method of turning off the AC power supply, tape remains twisted around the cylinder, if it is being reproduced, to cause the tape damages or it becomes impossible to take out the cassette if the cassette is within the VCR.

SUMMARY OF THE INVENTION

Accordingly, an objection of the present invention is to provide a video cassette recorder for rental use, which has a timer means for counting the preset time, a back-up power supply such as battery or the like, and a start means for starting the timer means, thereby to make it impossible to perform the reproducing operation till the re-starting is performed by the start means again after the lapse of the preset time from the timer start.

According to the present invention, a method in which the user cannot operate easily is employed in such a manner that a magnetic switch using Hall IC or the like, an optical switch for detecting the coded optical pulse input, a mechanical switch hidden within the VCR or the like is used as a start means. In the embodiment of the present invention, the start means is represented by a mechanical switch.

To make it impossible to perform the reproduction after the lapse of the preset period, it is performed the controlling operation for making it impossible to perform the normal reproduction operation such as to disturb the servo, to stop the operation of the video signal processing circuit, to make it impossible to receive the operation key input into the reproduction mode, or the like. In the first embodiment, the description is given with the servo-disturbing operation, in the second, third embodiments, with the operation for stopping the video signal processing circuit operation.

Also, in the second, third embodiments of the present invention, the power supply from the back up power-supply to the timer means is partially or fully stopped after the lapse of the preset period to use inexpensive dry batteries as the back-up power supply of the equivalently longer service for a long period of years. In addition, in the second embodiment, the reproduction operation of VTR is adapted to be made impossible to be performed when the battery voltage has become lower than the set voltage or if the battery has been removed, while, in the third embodiment, the VTR is adapted to be reproduced, i.e., to be provided on the fail safe side when the battery has been disengaged with by some accident.

BRIEF DESCRIPTION OF THE DRAWINGS

These and other objects and features of the present invention will become apparent from the following the description taken in conjunction with the preferred embodiment thereof with reference to the accompanying drawings, in which.

DETAILED DESCRIPTION OF THE INVENTION

Figure 1:
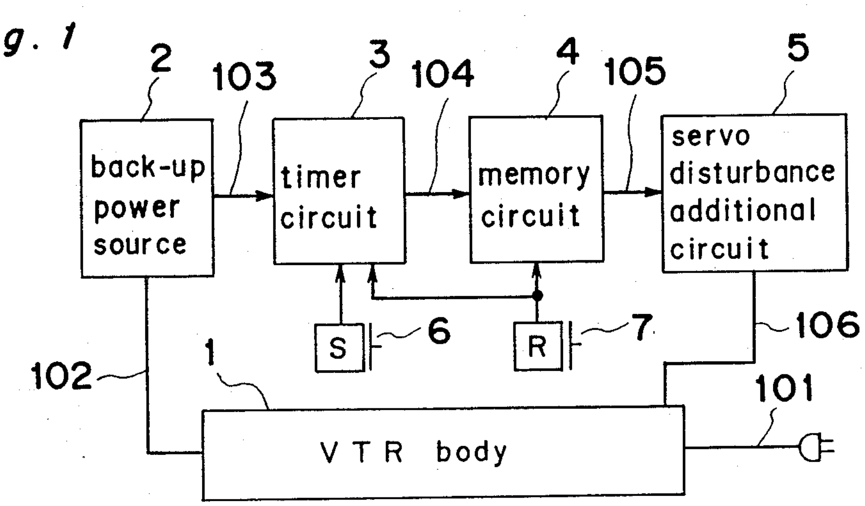
FIG. 1 is an electric block diagram showing the entire construction of a video cassette recorder for rental use in accordance with a first embodiment of the present invention.

Before the description of the present invention proceeds, it is to be noted that like parts are designated by like reference numerals throughout the accompanying drawings.

Referring now to FIG. 1, there is shown a video cassette recorder for rental use according to the first embodiment of the present invention, which includes a video tape recorder (VTR) main body 1, a back up power supply portion 2, a timer portion 3 is backed up (103) by the back up power-supply portion 2 for the firm operation, a memory portion 4 which generates the control output (105) through the output (104) of the timer portion 3 to be produced after the lapse of a predetermined time, and retains the producing condition, a servo disturbance adding portion which inputs the control output (105), and outputs the servo disturbance signal (106) to the servo circuit portion 11 of the VTR main body 1.

Figure 2:
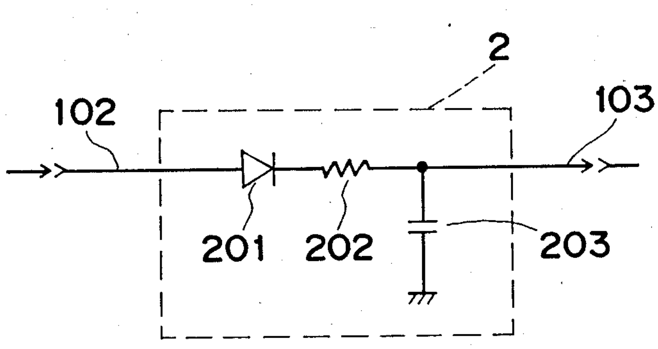
FIG. 2 is an electric circuit diagram showing a back up power supply employed in the first embodiment.

FIG. 2 is a circuit diagram showing the concrete construction of the back up power-supply portion 2, which includes the power supply input from the VTR main body 1, a diode for preventing the reverse current, a resistor 202 for limiting the charge current, and a capacitor 203. When the capacitor 203 is charged with he VTR being in the normal operation, the electric charge stored in the capacitor 203 is drawn out as a driving current, if the power supply (101) of the VTR main body 1 is turned off, to operate the timer portion 3. When the timer portion 3 is composed of a CMOS circuit of extremely low consumption current with an electric double-cell capacitor being used for the capacitor 203, the timer portion 3 may be back-up-driven a few days or more through the electric charge stored in the capacitor 203. Also, the back-up power portion 2 may be a dry battery or a solar battery.

Figure 3:
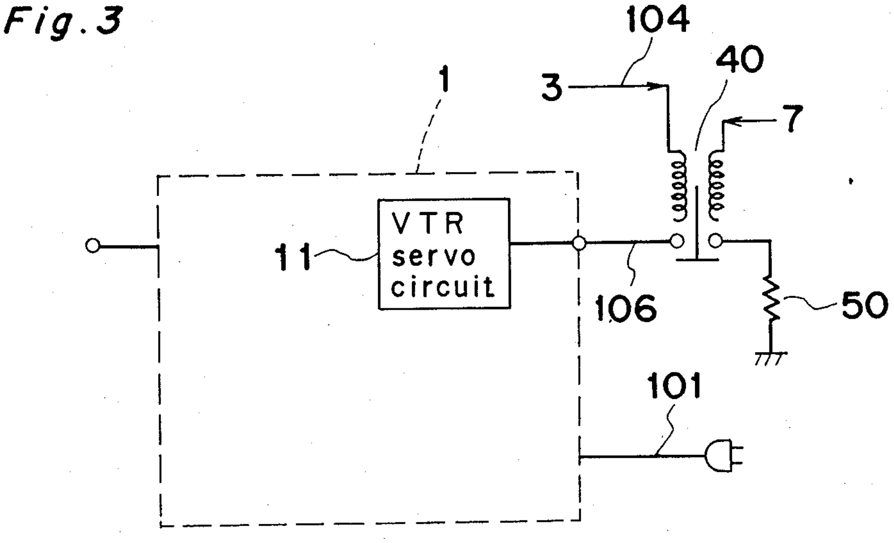
FIG. 3 is another electric circuit diagram showing a timer means employed in the first embodiment, wherein disturbances are given to a VTR servo by the output of the timer means.

FIG. 3 is a circuit diagram showing the concrete construction of the memory portion 4, and the servo disturbance adding portion 5. The memory portion 4 is composed of a latching relay 40. The contact of the relay 40 becomes conductive through the output (104) of the timer portion 4 to retain the conductive condition, the self-retention is released through the output of the reset circuit 7 to perform the opening operation. The servo disturbance adding portion 5 .is a resistor 50 which is connected at its one end to the earth.

The operation of the first embodiment will be described hereinafter. The initial condition of the recorder is one where the timer portion 3 and the memory portion 4 are reset. When the power supply of the VTR main body 1 is put to work, the capacitor 203 of the back up power-supply portion 2 is sufficiently charged. At this time, the start switch 6 is depressed to start the driving operation of the timer portion 3. For example, when the lease dealer lends the apparatus of the present embodiment, he depresses a start switch 6.

The timer portion 3 may set a predetermined lapse time of , for example, a specified day with a preset portion (not shown in the drawings). Accordingly, when the start switch 6 is depressed, the timer operation starts until a predetermined time. At this time, the output (106) of the servo disturbance addition portion 5 is not provided. Thus, the VTR main body 1 normally operates. Also, if the power supply of the VTR main body 1 is removed at this time, the operation of the timer portion 3 is continued by the back up power-supply 2.

After the lapse of the set time, the timer portion 3 generates the output (104) to generate the control output (105) in the memory portion 4, and the memory portion 4 is retained in a condition where the control output (105) may be produced. The servo disturbance adding portion 5 to which the control output (105) has been inputted generates the output (106) in the servo circulation portion to disturb the normal servo condition.

In the embodiment of FIG. 3, the latching relay 40 is set by the output of the timer portion 3 to make the contact conductive so that the resistor 50 is connected to the VTR servo circuit portion 11. As the servo constant is compelled to change by the resistor 50, the number of revolutions of the cylinders changes when, for example, the servo circuit portion 11 controls the rotation of the cylinder (drum) so that the images are carried away. It is to be noted that the voice is reproduced to the normal state. Also, as the tape speed is changed when the servo circuit portion 11 is adapted to control the rotation of the capstan, the images and the voices are normal reproduction outputs no more.

It is to be noted that the servo disturbance adding portion 5 disturbs the cylinder or the servo circuit of the capstan and furthermore disturbs the synchronism of the image signals to achieve the desired object.

In the present embodiment, the power supply of the VTR main body 1 is adapted not to turn off particularly by the control output of the memory portion 4. This is because the system control means may become inoperative when the power supply is turned off. Namely through the user is required to understand that the images or the voices are disturbed, the user cannot perform the repairing operation, cannot expect the normal operation, at least the ejecting operation is required to be possible to be performed so that the head or the kept tape may not be damaged.

As the output condition which causes this condition is retained in the memory portion, the original normal condition cannot be restored on the side of the user.

The reset circuit 7 is provided with an input portion which the user cannot operate. The starting operation is performed by, for example, a switch provided within the apparatus, the special input forms, for instance, bar code reading, code inputs of infrared rays or ultrasonic waves, from the external portion of the apparatus. The reset circuit 7 resets the memory portion 4 and the timer portion 3. Namely, the control output from the memory portion 4 is removed by the reset operation while the servo disturbance is caused, so that the servo is restored to the normal state.

Also, the operation of the timer portion 3 may be stopped by the resetting operation of the timer portion 3 which is set and being operated. The re-start of the timer portion 3 is performed by the depression of the start switch 6.

According to the first embodiment as described hereinabove, the servo disturbance is caused after the lapse of the set time, if the timer portion 3 is kept started through the depression of the start switch 6 when the lease trader lends the apparatus, to disturb the images. As the user cannot restore the servo to the normal state, it is brought back to the lease trader again. The lease trader performs the resetting operation in a given method so that it may be restored to the original condition. In the present embodiment, the start operation and the RST operation are independent. But if the resetting operation is performed simultaneously at the starting operation as in the second, third embodiments, it is needless to say that one switch input means will do.

More real second, third embodiments will be described hereinafter.

Generally, the large-capacity capacitor or the secondary battery which may be charged are often used as the back up power-supply. They are semi-permanent in service life. They have merits as a back up power-supply of short period if they are energized for a long time and are sufficiently charged. When the using form of low operation rate for them is considered where they are left behind the counter as the rental VTR is, and the non-energization time is much longer than the energization time as in a case they are energized for a short time if the user returns home with them, they have no merits as compared with the primary battery and they are higher in cost. Also, if the primary battery is used, the lithium battery of long life or the like is higher in cost.

In the second, third embodiments, the timer circuit may be backed up for long hours even with the general inexpensive primary battery instead of the inexpensive primary battery from which we can expect the long service.

The construction of the second, third embodiments is characterized in that a timer means of counting clock signals to make it impossible to use the operating condition of the picture appliance main-body when the counted value reaches a prescribed, and a back up power-supply which is a power supply separate from the power supply of the picture appliance main body to back up the timer means are provided, the picture appliance main body is adapted to make it impossible to use the image picture main body after the detection of the prescribed time lapse by the timer means, and a back up power-supply switch circuit is provided wherein the timer means turns off the energization from the back up power supply after the lapse of the prescribed time.

As the timer means is backed up by the back up power-supply, the time lapse from the lease start time independently of the energization condition of the picture appliance main body is counted. When the timer means completes the counting of the prescribed value, the picture appliance main body is made impossible to be used, and the back up power-supply switch circuit is switched to reduce the consumption of the back up power-supply.

Figure 4:
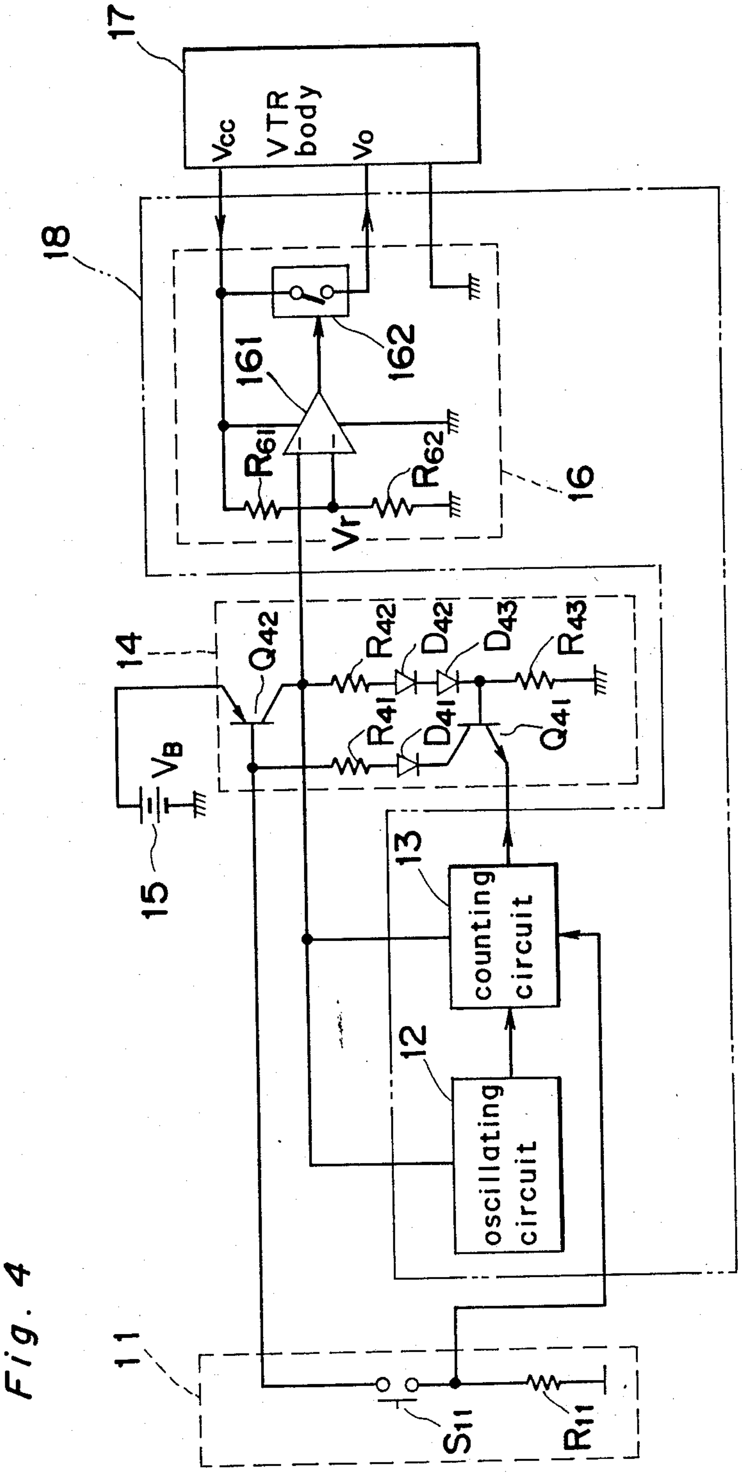
FIG. 4 is an electric circuit diagram showing the entire construction of a video cassette recorder for rental use in accordance with a second embodiment of the present invention, and FIG. 5 ia an electric circuit diagram showing the entire construction of a video cassette recorder for rental use in accordance with a third embodiment of the present invention.

FIG. 4 shows the second embodiment, which includes a trigger circuit 11 composed of a push switch $S_{11}$, and a resistor $R_{11}$ an oscillation circuit 12 for generating the clock pulse of a constant period, a counting circuit 13 which counts the clock pulse, when the counted value reaches the prescribed value, the output becomes "H" level from "L" level, and is reset with the reset signal of the "H" level, a back up power-supply switch circuit 14 composed of transistors $Q_{41}$, $Q_{42}$, diodes $D_{41}$, $D_{42}$, $D_{43}$, resistors $R_{41}$, $R_{42}$, $R_{43}$, a battery 15 which becomes a voltage $V_B$ as a back up power-supply, a discrimination circuit 16 which is composed of a comparator 161, a switch 162, resistors $R_{61}$, $R_{62}$, and turns on the switch 162 when the output voltage of the back up power-supply switch circuit 14 is higher than the comparative voltage $V_5$ which has been set by the resistors $R_{61}$, $R_{62}$, and a VTR main body 17 as a picture appliance main body which supplies the voltage $V_{cc}$ to the discrimination circuit 16, is controlled by the output voltage of the switch 162 to the possible reproducing operation or the impossible reproducing operation.

The timer means 18 in the second embodiment is composed of the oscillation circuit 12, the counting circuit 13 and the discrimination circuit 16.

First, depress the push switch $S_{11}$ and the transistor $Q_{42}$ becomes "on" through the flowing of the base current, the counting circuit 13 becomes "L" level in output through the application of the resetting voltage. As the transistor $Q_{41}$ becomes on in condition to flow the base current of the transistor $Q_{42}$, the on condition of the transistor $Q_{42}$ is retained after that if the switch $S_{11}$ is turned off. The voltage is supplied to each portion through the back up power-supply switch circuit 14 retained on in condition from the battery 15. In the counting circuit 13, the push switch $S_{11}$ becomes off in condition, the pulse counting starts when the reset is removed. When the VTR main body 17 is energized, the power-supply voltage $V_{cc}$ is applied upon the discrimination circuit 16 to apply the battery voltage $V_B$, as the input compared, higher than the comparison voltage $V_r$ of the comparator 161. The switch 162 becomes "on", thus resulting in the output voltage $V_o=V_{cc}$. If the output voltage $V_o$ is the power-supply voltage input of the video circuit system of, for example, the VTR main body 17 or the status input prohibiting the reception of the reproduction key input, the possible reproduction, or the impossible reproduction may be controlled easily. The above-described time is in the possible reproduction condition.

When the counting circuit 13 counts the clock pulse and the counted value reaches the prescribed value, the output becomes "H" level from "L" level. The transistor $Q_{41}$ becomes off, thus the transistor $Q_{42}$ becomes also off. Namely, the back up power-supply switch circuit 14 becomes off in condition, and the voltage supply to each portion from the battery 15 stops. On the other hand, in the discriminating circuit 16, the switch $6_2$ becomes off, thus resulting in the output voltage $V_o=0$ volt to make it impossible to perform the reproducing operation. The off condition of the back up power-supply switch circuit 14 continues till the push switch $S_{11}$ is depressed again with the power of the battery being not consumed. It is to be noted that the push switch $S_{11}$ is mounted in a position where the operation may be performed only behind the counter at the lease.

According to the second embodiment as described hereinabove, the back up power-supply switch circuit is turned off after the prescribed digital value, namely, the predetermined time to stop the voltage supply of the entire circuit to prevent the unnecessary battery consumption. Also, all the necessary thing for the operation is to depress the push switch $S_{11}$ so that the operation is easier to be performed. As the input compared to the discrimination circuit 16 after the timer starts is the output voltage of the back up power-supply switch circuit 14, that is, the voltage of the battery 15, and, thus, if the comparison input voltage $V_r$ is set to a voltage requiring the replacement of the battery, the battery voltage may be checked. Also, when the battery has been removed by inferior users, the condition becomes the impossible reproduction one.

Figure 5:
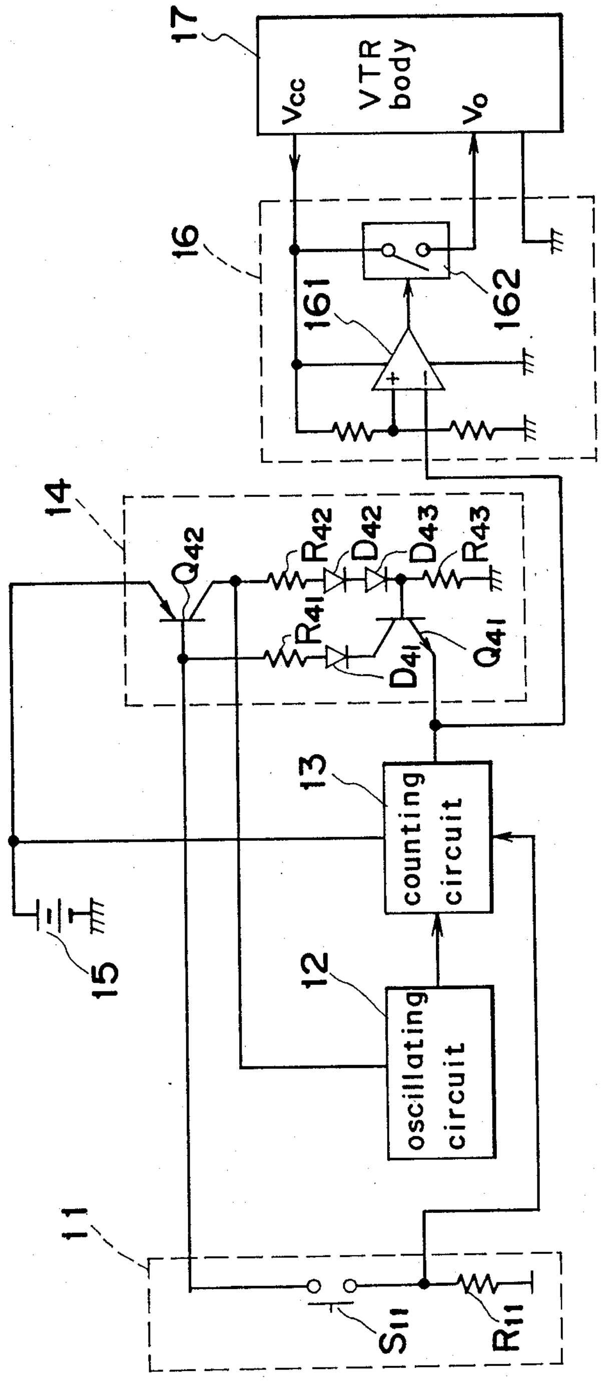

FIG. 5 shows the third embodiment. It is to be noted that the same parts as in FIG. 4 are designated by the same reference numerals throughout the accompanying drawing.

The difference between FIG. 4 and FIG. 5 is that the comparison input $V_r$ is applied upon the non-inversion input terminal $\oplus$ of the comparator 162 of the discrimination circuit 16, while the output voltage of the counting circuit 13 is applied to the inversion input terminal $\ominus$ as an input to be compared, and the power-supply voltage of the counting circuit 13 is normally fed directly from the battery 15.

In the case of FIG. 5, the counting circuit 13 is reset when the push switch $S_{11}$ is depressed, the output becomes "L" level, the back up power-supply switch circuit 14 is retained on the on condition, and the oscillation circuit 12 is energized to start the operation. Also, as the input compared of the discrimination circuit 16 is the "L" level of the counting circuit 13 under the comparison voltage $V_r$, the comparator 161 is on, and the switch 162 becomes on, thus resulting in the output voltage $V_o=V_{cc}$ to make it possible to perform the reproducing operation. Then, when the digital value of the counting circuit 13 reaches the prescribed value, the output become "H" from "L", the back up power-supply switch circuit 14 becomes off to stop the operation of the oscillation circuit 12. Accordingly, the output of the counting circuit 13 remains "H", the comparator 161 of the discriminating circuit 16 is off, the switch 162 is off, thus resulting in the output voltage $V_o=0$ so that the VTR main body 17 becomes an impossible reproduction condition. The off condition of the back up power-supply switch circuit 14 continues until the output of the counting circuit 13 is reset from the "H" to the "L" when the switch $S_{11}$ is depressed again. During this period, no clock pulse inputs are provided in the counting circuit 13 with the condition being static. As the consumption power may be made smaller enough to be neglected, the battery 15 is hardly consumed.

Even in the third embodiment as described hereinabove, the battery 15 is less consumed and the operation is easy to perform. Furthermore, when it is different from the second embodiment, the output of the counting circuit 13 is "L" as the compared input of the discrimination circuit 16, the VTR main body 17 is adapted to be able to be used. The fail safe works on the side of the possible use with respect to accidents that the voltage of the battery 15 is lowered because of some cause or the battery 15 is disengaged from so as to make the user claim difficult to be laid.

In FIG. 5, the voltage is normally applied from the battery 15 upon the counting circuit 13, the power supply is applied upon the oscillation circuit 12 from the battery 15 through the back up power-supply switch circuit 14. But the voltage is normally applied from the battery 15 upon the oscillation circuit 12 so that the consumption power may be reduced through the on or off the voltage to the counting circuit by the back up power-supply switch circuit 14.

In the second, third embodiments, $S_{11}$ is made a push switch, which may be substituted by a reed switch or the like to be operated by a magnet or the like. Also, it is easy to add into the discriminating circuit 16 a display circuit as to whether or not the VTR main body 17 is on a usable condition. Furthermore, the back up power-supply switch circuit 14 may be operated if the diode $D_{41}$ is adapted to be connected directly to the output of the counting circuit 13 with the transistor $Q_{44}$, the resistors $R_{42}$, $R_{43}$, the diodes $D_{42}$, $D_{43}$ being removed. In addition, the picture appliance main-body is not restricted to the above-described VTR main body, but may be, needless to say, applied to all the picture appliance of a portable type.

As is clear from the foregoing description, the second, third embodiments of the present invention are adapted to turn off the energization from the back up power-supply which backs up the timer means when the timer means detects the lapse of the prescribed time, whereby the consumption power of the back up battery may be reduced when the usable period of the picture appliance for rental use is prescribed through the time lapse of the lease start by the timer means, and the primary battery of the low price as the back up power-supply may be used equivalently as a long battery of the power-supply life service so that the stable operation of the timer means may be expected for a long period.

It is to be noted that the present invention is not restricted only to the embodiments, includes the combinations among the respective embodiments, the combinations of the elements of the respective embodiments. Also, the present embodiments are composed of hardwares, but they may be, needless to say composed of microprocessor, etc.

What is claimed is:

1. A video cassette recorder for rental use comprising at least a timer means counts clock signals is adapted to generate a control output to make it impossible to perform the normal reproducing operation of the recorder when the count value reaches a prescribed value, a back up power-supply which is independent of the power supply of the recorder main body to back up said timer means, a start means which resets the output of said timer means and the count value and causes the counting operation start, and a back up power-supply switch circuit which turns on the power-supply to said timer means from the back up power-supply with said start means output to turn off one portion or all the portions of the energization to the timer means from said back up power-supply when the count value of said timer means reaches the prescribed value; wherein the number of the head cylinder revolutions of the recorder is varied from the normal value by the control output which makes the reproducing operation impossible to perform so as to prevent the normal reproduction images from being provided.

2. The video cassette recorder for rental use in accordance with claim 1, wherein said timer means includes a clock generating circuit to be energized respectively through a back up power-supply switch a counter circuit for turning off said back up power-supply switch circuit when the count value of the clock reaches a prescribed value, and a discriminating circuit which is supplied with voltage from the apparatus main body to generate a control signal to make the normal reproduction operation of the recorder when the output of the back up power supply switch circuit is lower than the predetermined voltage.

3. The video cassette recorder for rental use in accordance with claim 1, wherein said timer means includes a clock generating circuit to be energized through a back up power-supply switch circuit, a counter circuit which is normally backed up by the back up power-supply to turn off said back up power-supply switch circuit when the count value of the clock reaches a prescribed value, and a discriminating circuit which is supplied with voltage from the recorder main body to generate a control signal to make the normal reproducing operation of the recorder impossible to perform when the output of the back up power-supply switch circuit is lower than the predetermined voltage.

4. The video cassette recorder for rental use in accordance with claim 1, wherein said timer means includes a clock generating circuit to be energized through the back up power-supply switch circuit, a counter circuit which is normally backed up by the back up power-supply, the output level becomes high in level and said back up power-supply switch circuit is turned off when the count value of the clock reaches the prescribed value with the output level being 0 until if reaches the prescribed value, a discriminating circuit for generating a control signal which makes the normal reproduction operation of the recorder impossible to perform when said counter output is more than the predetermined voltage.

5. The video cassette recorder for rental use in accordance with claim 1, wherein the power-supply feed of the video signal processing circuit of the recorder is stopped by the control output which makes the reproducing operation impossible to perform.

6. The video cassette recorder for rental use in accordance with claim 1, wherein the control output which makes the reproducing operation impossible to perform causes it impossible to receive the operation key input, for reproducing use, of the recorder.

* * * * *